United States Patent Office 3,454,689
Patented July 8, 1969

3,454,689
PROCESS FOR THE PREPARATION OF SHAPED ARTICLES FROM LACTAM POLYMERS
William E. Garrison, Parkersburg, W. Va., assignor to E. I. du Pont de Nemours and Company, Wilmington, Del., a corporation of Delaware
No Drawing. Filed July 28, 1964, Ser. No. 385,804
Int. Cl. B29h 7/20; B29d 27/00
U.S. Cl. 264—53                                          20 Claims

ABSTRACT OF THE DISCLOSURE

A process for shaping lactam polymers, without being limited to shaping in a mold, involves heating the lactam in the presence of a catalyst and a cocatalyst, mixing and pouring the mixture into a vessel heated to at least 140° C., maintaining the mixture at a temperature between 160° C. and the crystalline melting point of the lactam polymer until the mixture attains a rubber modulus of 4–400 p.s.i., and then removing the material from the vessel and, within a period of about 0.5 minute following removal, shaping the material into article(s) of dimensions different from those of the material removed from the vessel.

---

This invention relates to the preparation of shaped polylactam articles. More particularly, it relates to a novel, commercially feasible process of manufacturing polycaprolactam articles of all sizes, large and small.

Crystalline polymeric materials, of which polylactams are one group, cannot be shaped or formed in a commercially feasible manner at temperatures below their crystalline melting points. At such temperatures, such materials are extremely rigid and their resistance to deformation is such that the fracture of the materials tends to result when the necessarily high pressures for shaping are applied.

Some polymeric materials can be shaped at a temperature above the temperature at which they start melting. Such materials as polyethylene, polystyrene, and the like display a slow decrease in viscosity above their softening temperature. Thus, a workable region is provided in which the polymer can be vacuum-formed, pressure-formed, calendered, extruded, etc., into practically any shape desired. The polylactams, on the other hand, soften completely and turn to liquid above their comparatively sharp melting points, and thus, cannot be shaped successfully.

Heretofore, polylactams have been polymerized from lactams at temperatures below the melting point of the polymer in molds that have the form of the desired shaped article. While this process can be used commercially to make large articles, it is apparent that the preparation of a multiplicity of small pieces would not be feasible by this process. Such a process would require so many molds and so much handling that the processing cost for small articles would be unreasonably high.

It is an object of the present invention to provide a commercially feasible process for the preparation of polylactam articles. It is a further object to provide a process in which the polylactam is first prepared as a billet or a sheet that can be formed into desired articles under moderate stresses. Other objects will appear hereinafter.

Although the process will be described for the polymerization of caprolactam, it should be understood that it is applicable to the polymerization of the higher lactams, i.e., lactams containing at least six carbon atoms in the lactam ring, to the corresponding polyamides. Hence, besides ε-caprolactam, the process is applicable to enantholactam, caprylolactam, decanolactam, undecanolactam, dodecanolactam, pentadecanolactam, hexadecanolactam, methylcyclohexanone isoximes, cyclic hexamethylene adipamide, and the like, and mixtures thereof.

The objects are accomplished by a process in which the caprolactam is first heated to a temperature of at least 100° in the presence of a catalyst and a cocatalyst. The heated materials are then mixed and the mixture is poured into a mold which has previously been heated to a temperature of at least 140° C. This mold is usually in a form that will produce a large sheet or billet. This mold may be trough-like, having only a base and sides, so that the material may be cast as a continuous sheet or billet for later shaping in a continuous or batch manner. The mixture is maintained in this mold at a temperature below the crystalline melting point of the polylactam but at least 160° C. by any conventional means, i.e., the use of heating coils or the like in the walls of the mold. The specific minimum temperature above 160° C. will depend upon the particular monomer, catalysts, additives, time available for remaining in the mold, etc. In any event the mixture is maintained in the mold at a temperature of at least 160° C., preferably between 180° and 225° C. for a time sufficient for the mixture to attain a rubber modulus of at least 4 p.s.i., preferably at least 10 p.s.i. This time may be from about 0.5 to 3 minutes. The rubber modulus will rise, but will not increase above 400 p.s.i. for a period of about 1.5 minutes to about ten minutes or more, and, in some cases, as long as 60 minutes. At any time during this period, the billet or sheet can be removed from the mold, and, immediately after removal (within about 0.5 minute), shaped into the desired article or articles.

The catalyst is the well-known anionic polymerization catalyst. This catalyst is prepared from a base such as alkali and alkaline earth metals such as lithium, sodium, potassium, magnesium, calcium, strontium, etc., either in metallic form or in the form of hydrides, borohydrides, oxides, hydroxides, carbonates, etc.; organometallic derivatives of the foregoing metals, as well as other metals, such as butyl lithium, ethyl potassium, propyl sodium, phenyl sodium, triphenylmethyl sodium, diphenyl magnesium, diethyl zinc, triisopropyl aluminum, diisobutyl aluminum hydride, sodium amide, magnesium amide, magnesium anilide, Grignard reagent compounds, such as ethyl magnesium chloride, methyl magnesium bromide, phenyl magnesium bromide, and the like.

The cocatalysts are usually derived from organic and inorganic acids of particular types. Some effective cocatalysts include acylating agents and acyl compounds, for example, acyl halides, anhydrides, imides, and the like, organic isocyanates, ketenes, and substituted ureas. Specifically desirable are N-substituted imides having the structural formula

wherein A is an acyl radical such as carbonyl, thiocarbonyl, sulfonyl, phosphinyl, and thiophosphinyl radicals, B is an acyl radical of the group A and nitroso, R is a radical such as A, hydrocarbyl, and heterocyclic radicals and derivatives thereof, wherein said radicals in turn can contain radicals such as carbonyl, thiocarbonyl, sulfonyl, nitroso, phosphinyl, thiophosphinyl, tert-amino, acylamido, N-substituted carbamyl, N-substituted carbamido, alkoxy, ether groups and the like, A and B, or A and R, together can form a ring system through a divalent linking group, and any free valence bond of the A and B radicals can be hydrogen or R, excepting A directly linked thereto. The carbonate esters having at least one carbocyclic aromatic ring attached to the carbonate (e.g., the polycarbonate of 4,4'-dihydroxydiphenyl-2,2-propane), which is the subject of U.S. patent application Ser. No. 242,895, filed Dec. 7, 1962, and assigned to the assignee of the present application, is another desirable cocatalyst. Still another desirable cocatalyst is 2,2,4-trimethyl-3-hydroxy-3-pentenoic acid, β-lactone, which is the subject of U.S. patent application Ser. No. 229,161, filed Oct. 8, 1962, and assigned to the assignee of the present application. The acyl-bisheterocyclic compounds (e.g., sebacoyl-bispyrazole) disclosed in U.S. patent application Ser. No. 266,810, which was filed on Mar. 21, 1963, and assigned to the assignee of the present application, are also desirable cocatalysts. The triazine derivatives (e.g., the caprolactam derivatives of triazines) disclosed in U.S. patent application Ser. No. 155,791, which was filed on Sept. 5, 1961 and was assigned to the assignee of the present application, is another desirable class of cocatalysts.

The anionic catalyst is prepared by heating the lactam with the base at a temperature between about 25 and 225° C. and above the melting point of the lactam. The base can be added to the total lactam which is to be polymerized or to a portion of the lactam which is to be polymerized and this portion of the lactam containing the anionic catalyst added to more of the lactam later. Essentially no polymerization occurs during the preparation of the anionic catalyst carried out between the melting point of the lactam and about 225° C. However, if the anionic catalyst is to be held for any appreciable time, it is preferably held at a temperature below about 125° C. The time required for this step in the process depends upon the strength of the base employed, the proportion added, and the temperature chosen and can be from a few seconds to several hours. Preferably, the lactam should be essentially anhydrous as should the added base. Generally, the amount of base charged should be about from 0.1 to 10 mole percent based on the total lactam used in preparing the anionic catalyst and the subsequent polymerization. Proportions in the higher end of this range produce lower molecular weight polyamides and faster rates, so optimum proportions for most purposes are from about 0.2 to 5 mole percent of the strong base.

The cocatalyst can be employed in proportions varying from about 0.05 to about 5 mole percent based on the total lactam. Preferably, the proportion of the cocatalyst is less than the proportion of the anionic catalyst and usually not more than ½ of the proportion of anionic catalyst. The cocatalyst can be added to the lactam containing the anionic catalyst or dissolved in a separate portion of the lactam and the two portions of lactam mixed at the time the polymerization is desired. For optimum operation of the process of this invention, an inert gas such as nitrogen is bubbled through the molten lactam during the initial reaction with the basic catalyst to remove low molecular weight compounds such as water and to prevent oxidation. Alternatively, the reaction of the lactam with the basic catalyst can be carried out under reduced pressure in which case the low molecular weight compound is distilled from the lactam.

Specifically, the first important step of the process is the polymerization initiation step. It is generally performed at a temperature between the melting point of the lactam monomer and the melting point of the polymer, i.e., 100° C.–225° C., preferably from about 125° C. to about 200° C. In the preferred process, caprolactam and the catalyst are mixed at a temperature above 140° C. and, in a separate operation, caprolactam and the cocatalyst are mixed at substantially the same temperature. The mixture of cocatalyst and lactam is then added to the mixture of catalyst and lactam; and the resultant mixture, after a very short additional mixing period, is poured into a mold which is maintained at a temperature of at least 140° C.

Since the polymerization reaction is exothermic, the temperature of this resulting mixture in the mold rises. For purposes of the present invention, it is critical to maintain the temperature in the mold between 160° and 225° C., preferably 180°–225° C. This temperature is maintained until the rubber modulus of the material in the mixture is between 4 and 400 p.s.i., usually 10–200 p.s.i. To determine the temperature of the material in the mold, a thermocouple may be imbedded in the mold.

The rubber modulus is measured by forming a bar, one-eighth of an inch thick, of the mixture in the mold, the mold imparting two bench marks to the bar. After about 0.5 minute to about three minutes, the bar is removed quickly from the mold; attached to a stationary battery clip; and at 0.15 minute following its removal from the mold, a known weight of 0.5 pound to 5 pounds (8–80 p.s.i.) is attached to the opposite end of the bar by a second battery clip. When elongation ceases, the length between bench marks is measured and the rubber modulus is calculated from the following formula:

$$S/r - 1/r^2$$

wherein

S is the initial load in p.s.i.; and
r is the ratio of final length to initial length between the bench marks.

A modulus of less than 4 p.s.i. indicates that the polymerized sheet has insufficient strength to support itself for handling. A modulus greater than 400 p.s.i. indicates that the material is too rigid for forming using the vacuum-forming method.

After it has been determined that the billet or sheet has the proper rubber modulus, it is removed from the mold and formed into useful shapes. The mold is usually coated with a fluorocarbon polymer, e.g., polytetrafluoroethylene, to facilitate the removal of the billet or sheet. The operator has from about 0.5 minute to ten minutes or more in which to remove the billet or sheet from the mold. Following removal, the operator has the time available in the conventional forming processes of about 0.5 minute at ordinary temperatures, 15–35° C., in which to shape the article using any of the techniques associated with the shaping of molten polymeric materials, e.g., vacuum-forming, calendering, etc. The specific time available for such shaping or forming will depend upon the conditions, e.g., specific ambient temperature, pressure imposed, etc. at which the shaping is performed.

In order to provide a substantially long period in which a billet or sheet of polycaprolactam can be successfully removed and shaped, the temperature of the material maintained in the mold should be at least 180° C. and the cocatalyst is preferably 2,2,4-trimethyl-3-hydroxy-3-pentenoic acid, β-lactone, the cocatalyst that is the subject of U.S. patent application Ser. No. 229,161. It has also been found to be desirable to add 0.5–5.0 weight percent of an alkali metal halide, e.g., sodium bromide, or a second lactam as a comonomer, to the mixture in order to further increase this period.

The success of this process is believed attributable to the following mechanism. The mechanism is theoretical and should not be considered to limit the scope of the invention. Caprolactam, when subjected to an elevated temperature in the presence of the proper catalytic compounds, will undergo two reactions, polymerization and crystallization. Both reactions are exothermic. At temperatures of the material in the mold below 160° C., it is believed that crystallization occurs almost immediately after and, at least partially simultaneously with, polymerization. Thus, the polymerized material formed, being also crystalline, is too rigid to be shaped successfully. By increasing the temperature to above 160° C., preferably above 180° C., it is believed that polymerization and crystallization become more widely separated in time. The wider the separation, the greater is the time that the material can be left in the heated mold prior to removal and forming. This would also serve to explain the success that results from using 0.5–5.0 weight percent sodium bromide. Sodium bromide is a crystallization inhibitor.

The process of this invention is useful in preparing articles of any size and shape from lactams. The process can be employed to obtain unusual shapes which would be difficult, if not impossible, to obtain by conventional methods. The process is recommended for forming shutters, molding, window frames, doors, e.g., cabinet doors, drawers, medicine cabinets, siding, gutters, buttons, toys by vacuum-forming, pressure-forming (pneumatically or hydraulically), embossing or calendering, etc. The process may be performed in a continuous or batch manner, the continuous method being preferred.

The process of this invention is operable in the presence of various fillers and reinforcing agents. Thus, if desired, glass mats or mats of synthetic fibers can be impregnated with the relatively soft polymer. Similarly, finely-divided fillers, such as calcium carbonate, calcium silicate, potassium titanate, glass fibers, alumina, etc. or glass microballoons can be suspended in the polymerizing mixture to obtain filled polycarboxylamides. Obviously, antioxidants, blowing agents, plasticizers, other resins, e.g., styrene, acrylic, nylon, polyester, colorants, and the like can also be employed. The process of this invention can also be used in the presence of a gas-generating material to produce foamed plastic articles. The process of this invention can be carried out as a coating process in which the relatively soft polylactam is applied as a surface to a web such as paper or a textile and then permitted to harden to form a coating on the substrate.

The invention will be more clearly understood by referring to the following examples, Example 5 representing the best mode contemplated for practicing the invention. These examples, although illustrating specific embodiments of the present invention, should not be considered limitative.

EXAMPLES 1–4

To 150 grams of dried $\epsilon$-caprolactam in a first test tube is added 2.7 grams of the polycarbonate of 4,4′-dihydroxydiphenyl-2,2-propane (equivalent to 0.8 mer percent of the lactam). The contents of the tube are melted under a nitrogen blanket in an oil bath at 155° C.; and the molten material is held at 155° C. under a sparge of nitrogen bubbling through at the rate of about 350 cc./minute.

In a second test tube, 150 grams of the dried $\epsilon$-caprolactam is melted under a nitrogen blanket and sparged with about 350 cc./minute of nitrogen. Then, 2.6 milliliters of a 35% slurry of sodium hydride in a 1:1 mixture of mineral oil and a high boiling oil hydrocarbon[1] is added to provide a solution equivalent to 3 mole percent base. The resultant base solution is held at 155° C. under a nitrogen sparge.

The contents of the first test tube are added to the second and the two liquids are mixed by inversion for 15 seconds. The polymerizing mixture is poured into a mold ⅛″ x 11″ x 11″ coated with polytetrafluoroethylene and held at 170° C. The progress of polymerization is indicated by the "no-flow" time determined by inserting a small wooden stick into the mixture and noting the time after which liquid will not run off the stick when it is withdrawn.

The "no-flow" time was 1.0 minute. At various times ranging from 0.5–1.7 minutes as shown in table following the "no-flow" time, i.e., following completion of polymerization, the resulting plastic, formable sheet, having attained a rubber modulus between 4 and 400 p.s.i., is removed and placed on a vacuum mold at room temperature in the form of a "Cubitainer" half. A vented back-up plate is placed over the sheet. After two minutes, the successfully formed object is removed.

In control Examples A–C wherein the polymerizing mixture is poured into the mold and held at 150° C., the "no-flow" time was 1.3–1.4 minutes. At times varying from 0.3–0.7 minute following the "no-flow" time, the sheet is removed and attempts are made to vacuum-form the sheet without success.

TABLE

| Example | Mold temp. (°C.) | No-flow time (minutes) | Time from inversion mixing to forming (minutes) | Formability |
|---|---|---|---|---|
| 1 | 170 | 1.0 | 1.5 | Good. |
| 2 | 170 | 1.0 | 2.0 | Do. |
| 3 | 170 | 1.0 | 2.3 | Do. |
| 4 | 170 | 1.0 | 2.7 | Do. |
| Control A | 150 | 1.3 | 1.6 | Fair. |
| Control B | 150 | 1.3 | 1.8 | Poor. |
| Control C | 150 | 1.4 | 2.1 | Impossible. |

EXAMPLE 5

Twenty grams of $\epsilon$-caprolactam is placed in a reaction vessel which is immersed in an oil bath at 150° C. and nitrogen is bubbled through the molten caprolactam at the rate of 350 cc./minute for 20 minutes. Sufficient sodium hydride is added to provide 1.5 mole percent of sodium hydride and is allowed to react. Then, 0.4 mole percent of the cocatalyst 2,2,4-trimethyl-3-hydroxy-3-pentenoic acid, $\beta$-lactone is mixed with the molten caprolactam at 150° C. The mixture is poured into a polytetrafluoroethylene-coated mold, ⅛″ in thickness, described in column 3, the material in the mold being maintained at temperatures of 170° C. and 180° C. during polymerization.

At 170° C., the material attains a rubber modulus of about 5 p.s.i. in about 1.5 minutes. It can be removed from the mold immediately or within an additional 1.5 minutes, during which period it remains formable (has a rubber modulus below 400 p.s.i.). Immediately after removal, the material is compressed into button-like articles in an unheated press.

At 180° C., the material attains a rubber modulus of about 5 p.s.i. in about one minute. Since the modulus remains between 5 p.s.i. and 200 p.s.i. for about 8 minutes and below 400 p.s.i. for almost 9 minutes, it can be removed from the mold and formed during a substantial period. After about 5 minutes, it is removed and compressed between platens into button-like articles.

EXAMPLE 6

The procedure of Example 5 is repeated using 0.5% and 1.0% by weight of sodium bromide in the mixture. The mixture at 150° C. is poured into the mold and is maintained at 170° C. In both cases, a rubber modulus of about 5 p.s.i. is attained in about 1.5 minutes. The rubber modulus of the material in the mold rises but remains below 400 p.s.i. for about three minutes when 0.5% of the sodium bromide is used and for about 3.5 minutes when 1.0% of the sodium bromide is used. It is removed from the mold during these periods and compressed into shapes.

EXAMPLE 7

The procedure of Example 5 is repeated using 2.0 mole percent of the sodium hydride and 0.4 mole percent of the polycarbonate of 4,4′-dihydroxydiphenyl-2,2-propane[2] as the cocatalyst. At 170° C. and 180° C., a rubber modulus of about 5 p.s.i. is attained in about 0.5 minute. The material can be removed from the mold at any time thereafter up to about three minutes when the mold is at a temperature of 170° C. and up to about 15 minutes at the mold temperature of 180° C., and, immediately after removal, formed into articles.

---

[1] "HB-40," manufactured by Monsanto Chemical Company.

[2] "Lexan 105," manufactured by General Electric Company.

EXAMPLE 8

The procedure of Example 5 is again repeated using 2.2 mole percent of the sodium hydride and 0.4 mole percent of the cocatalyst, triphenyl cyanurate. Results by maintaining the material in the mold at temperatures of 170° C. and 180° C. are substantially those obtained in Example 7. At 170° C., the material can be removed from the mold and formed or shaped during a period of 0.5–14 minutes; and at 180° C., 0.5 to over 60 minutes.

EXAMPLE 9

The procedure of Example 5 is repeated using 1.5 mole percent sodium hydride and 0.4 mole percent of N-acetyl caprolactam as the cocatalyst with substantially the same results as Example 5. The material can be removed from the mold and is formable for a period of about 2–7.5 minutes provided that the temperature of the material in the mold has been maintained at above 170° C.

EXAMPLE 10

Example 5 is repeated using sebacoyl-bis pyrazole as the cocatalyst. Substantially the same results as in Example 5 are obtained.

EXAMPLES 11–14

Example 5 is repeated using potassium stearate along with the catalyst and the following foaming agents:

Ex. 11—nitrogen gas
Ex. 12—dodecenyl azide
Ex. 13—dimethyl benzyl azide
Ex. 14—hexane Substantially the same results as in Example 5 are obtained for the foamed articles.

EXAMPLES 15–19

Example 5 is repeated using the following fillers in the mixture:

Ex. 15—calcium carbonate
Ex. 16—titanium dioxide
Ex. 17—calcium silicate [3]
Ex. 18—glass fibers
Ex. 19—glass microballoons Substantially the same results as in Example 5 are obtained for the filled articles.

[3] "Cab-O-Lite" F, manufactured by Godfrey L. Cabot, Inc.

What is claimed is:

1. A process for preparing a shaped article which comprises heating a lactam containing at least six carbon atoms in the lactam ring to a temperature of at least 100° C. in the presence of a catalyst and a cocatalyst; mixing the heated materials and pouring the mixture into a mold heated to a temperature of at least 140° C.; maintaining the mixture in the mold at a temperature between 160° C. and the crystalline melting point of the lactam polymer for a time sufficient for the mixture to attain a rubber modulus of 4–400 p.s.i.; removing the material having said rubber modulus of 4–400 p.s.i. from the mold; and, within a period of about 0.5 minute following removal, forming said material into at least one shaped article having dimensions different from those of the material removed from the mold.

2. A process for preparing a shaped article which comprises heating a lactam to a temperature of at least 100° C. in the presence of a catalyst and a cocatalyst; mixing the heated materials and pouring the mixture into a mold heated to a temperature of at least 140° C.; maintaining the mixture in the mold at a temperature between 160° C. and the crystalline melting point of the lactam polymer for a time sufficient for the mixture to attain a rubber modulus of 10–200 p.s.i.; removing the material having said rubber modulus of 10–200 p.s.i. from the mold; and, within a period of about 0.5 minute following removal, forming said material into at least one shaped article having dimensions different from those of the material removed from the mold.

3. A process as in claim 2 wherein said lactam is $\epsilon$-caprolactam.

4. A process for preparing a shaped article which comprises heating $\epsilon$-caprolactam to a temperature of at least 100° C. in the presence of a catalyst and a cocatalyst; mixing the heated materials and pouring the mixture into a mold heated to a temperature of at least 140° C.; maintaining the mixture in the mold at a temperature between 160° and 225° C. for a time sufficient for the mixture to attain a rubber modulus of 4–400 p.s.i.; removing the material having said rubber modulus of 4–400 p.s.i. from the mold; and, within a period of about 0.5 minute following removal, forming said material into at least one shaped article having dimensions different from those of the material removed from the mold.

5. A process as in claim 4 wherein said cocatalyst is 2,2,4-trimethyl-3-hydroxy-3-pentenoic acid, $\beta$-lactone.

6. A process as in claim 4 wherein said cocatalyst is the polycarbonate of 4,4'-dihydroxydiphenyl-2,2-propane.

7. A process as in claim 4 wherein said cocatalyst is triphenyl cyanurate.

8. A process as in claim 4 wherein said cocatalyst is N-acetyl caprolactam.

9. A process as in claim 4 wherein said cocatalyst is sebacoyl-bis pyrazole.

10. A process as in claim 4 wherein said caprolactam is heated in the presence of sodium bromide in addition to the catalyst and cocatalyst.

11. A process as in claim 4 wherein said catalyst is sodium hydride and said cocatalyst is 2,2,4-trimethyl-3-hydroxy-3-pentenoic acid, $\beta$-lactone.

12. A process as in claim 4 wherein said mixture also contains a filler selected from the group consisting of calcium carbonate, titanium dioxide, potassium titanate, glass fibers and glass microballoons.

13. A process as in claim 4 wherein said mixture is heated in the presence of a foaming agent and a shaped cellular article is produced.

14. A process as in claim 13 wherein said foaming agent is selected from the group consisting of nitrogen gas, dodecenyl azide, dimethyl benzyl azide and hexane.

15. A process for preparing a shaped article which comprises heating $\epsilon$-caprolactam to a temperature of at least 100° C. in the presence of a catalyst and a cocatalyst; mixing the heated materials and pouring the mixture into a mold heated to a temperature of at least 140° C.; maintaining the mixture in the mold at a temperature between 180° C. and 225° C. for a time sufficient for the mixture to attain a rubber modulus of 4–400 p.s.i.; removing the material having said rubber modulus of 4–400 p.s.i. from the mold and, within a period of about 0.5 minute following removal, forming said material into at least one shaped article having dimensions different from those of the material removed from the mold.

16. A process as in claim 4 wherein said mold is coated with a fluorocarbon polymer.

17. A process as in claim 4 wherein said mold is coated with polytetrafluoroethylene.

18. A process as in claim 1 wherein said material is formed into at least one shaped article having dimensions different from those of the material removed from the mold by vacuum-forming.

19. A process as in claim 4 wherein said material is formed into at least one shaped article having dimensions different from those of the material removed from the mold by vacuum-forming.

20. A process as in claim 15 wherein said material is formed into at least one shaped article having dimensions different from those of the material removed from the mold by vacuum-forming.

(References on following page)

References Cited

UNITED STATES PATENTS

| | | | |
|---|---|---|---|
| 2,525,972 | 10/1950 | Stott | 264—323 |
| 3,207,713 | 9/1965 | Hyde. | |
| 3,214,415 | 10/1965 | Giberson. | |
| 3,236,789 | 2/1966 | Fuller. | |
| 3,274,132 | 9/1966 | Giberson. | |
| 3,300,422 | 1/1967 | Bayerlein et al. | |

MURRAY TILLMAN, *Primary Examiner.*

W. J. BRIGGS, Sr., *Assistant Examiner.*

U.S. Cl. X.R.

260—2.5, 78; 264—50, 54, 90, 320, 321, 331